Nov. 19, 1968  W. FISCHER  3,412,306
CIRCUIT ARRANGEMENT FOR CONTROLLING THE SPEED
OF BATTERY-FED ELECTRIC MOTORS
Filed Oct. 8, 1965

INVENTOR.
WALTER FISCHER

BY

AGENT

United States Patent Office 3,412,306
Patented Nov. 19, 1968

3,412,306
CIRCUIT ARRANGEMENT FOR CONTROLLING THE SPEED OF BATTERY-FED ELECTRIC MOTORS
Walter Fischer, Vienna, Austria, assignor to North American Philips Company, Inc., New York, N.Y., a corporation of Delaware
Filed Oct. 8, 1965, Ser. No. 494,006
Claims priority, application Austria, Oct. 22, 1964, A 8,956/64
8 Claims. (Cl. 318—331)

ABSTRACT OF THE DISCLOSURE

A temperature responsive speed control circuit for a DC motor energized via a battery. The circuit includes first and second directly coupled transistors of opposite conductivity type in which the base current of one transistor is supplied by the collector current of the other. The first transistor is connected in series with the battery and the motor with the battery connected in the emitter circuit thereof. A temperature compensating diode connected in the forward direction provides both a reference voltage for, and a temperature stabilizing effect on, the second transistor.

---

Figure 1:
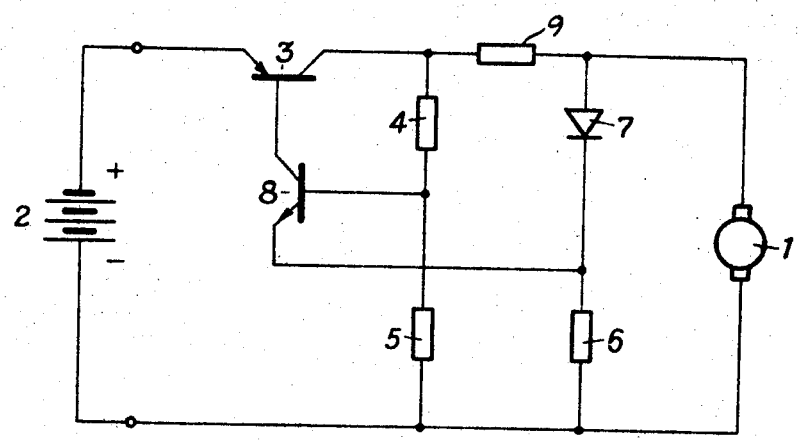

This invention relates to circuit arrangements for controlling the speed of a battery-fed electric motor. More particularly, the invention relates to a speed control circuit in which the current flowing through the motor is determined by the emitter-collector path of a first transistor to the base of which a control magnitude, derived from the voltage and/or the current of the motor, is applied through a second transistor directly coupled to the first transistor. Such circuit arrangements serve to ensure that the motor runs at constant speed even if the voltage of the battery varies. This is very important if a motor is energized from a battery since battery voltages tend to vary widely over the course of the operating period thereof. The larger the variations that can be eliminated by control, the longer the period during which a battery can be used. A variation of the battery voltage of up to 50% in the course of the operating period is often desired.

A circuit arrangement of the kind mentioned in the preamble is known, for example, from U.S. patent No. 3,309,596. In this known arrangement, the base current is supplied to the base of the first transistor, included in the circuit of the motor, through a collector-base resistor. The control magnitude is applied to said base through a second transistor directly coupled to the first transistor and of the same conductivity type as the first transistor. The control magnitude is obtained, for example, by means of a bridge circuit connected in parallel with the motor. One diagonal branch of the bridge includes the base-emitter path of the second transistor. A constant reference voltage is produced in a branch of the bridge, for example, by means of a semi-conductor diode, so as to obtain a control magnitude dependent upon the voltage of the motor. The control magnitude may also be made dependent on the current of the motor by including in the bridge circuit a resistor through which the current of the motor flows. The production of the control magnitude itself is not a part of the subject matter of the present invention and may be effected in many different ways.

With the aforementioned known circuit arrangement, it has been found that the voltage variations of the battery feeding the circuit arrangement have an unfavourable effect on the control circuit becauses of the fact that the collector-base resistor of the first transistor is included in the circuit of the motor. With such a circuit arrangement it is therefore necessary to provide a particular voltage-stabilizing stage between the battery and the control circuit proper. Another possibility of avoiding these difficulties was found in feeding the base of the transistor included in the circuit of the motor by way of a further transistor, likewise of the same conductivity type as the two other transistors. Such circuit arrangements are therefore comparatively complicated and bulky.

The circuit arrangement according to the invention avoids the aforementioned difficulties. It is very simple, requires a minimum of components and also ensures a very effective utilization of the battery feeding the motor. The invention is characterized in that the two directly coupled transistors are of opposite conductivity types and are connected so that the base current of the first transistor is provided by the collector current of the second transistor, and that the battery is included in the emitter circuit of the first transistor.

Since directly coupled transistor stages are comparatively strongly dependent on temperature, a resistor having a negative temperature coefficient or a diode may be included in the base-emitter circuit of the second transistor for stabilisation purposes. When using a diode for temperature stabilisation, this diode may advantageously also serve in known manner as a reference voltage source and be included in a bridge circuit provided for stabilizing the speed of the motor against variations of the supply voltage.

Since the voltage across the first transistor included in the circuit of the motor is a measure of the charged condition of the supply battery of the circuit, according to a further feature of the invention, the charged condition of the battery may advantageous be indicated in known manner by connecting a small lamp in parallel with the said transistor.

In order that the invention may be readily carried into effect, it will now be described in detail by way of example, with reference to the accompanying diagrammatic drawing showing two embodiments thereof. FIGURE 1 shows a circuit arrangement with a p-n-p transistor, and FIGURE 2 a circuit arrangement with an n-p-n transistor, in the current circuit of the motor.

FIGURE 1 shows a DC-motor 1 which is energized from a battery 2. The circuit of the motor includes a first transistor 3, in this example a p-n-p type transistor, which serves to adjust the voltage of the motor to a constant value. If the voltage of the motor is constant its speed is also constant. A control magnitude must therefore be derived from the voltage of the motor and for this purpose a bridge circuit comprising resistors 4, 5, 6 and a diode 7, the latter for producing a reference voltage, is connected in parallel with the motor. The diagonal branch of the bridge includes the base-emitter path of a second transistor 8 which, according to the invention, is of a conductivity type opposite to that of transistor 3, and hence of the n-p-n-type. The transistor 8, having its collector connected to the base of transistor 3, provides the base current for the latter transistor, which base-current constitutes the control magnitude. The bridge also includes a low-ohmic resistor 9 through which the current of the motor flows so as to obtain also a control as a function of variations of the load.

The circuit arrangement operates as follows:

A constant voltage, which, serves as a reference voltage, is set up across the diode 7 which is operated in the pass direction, said voltage being substantially independent of the voltage across the motor. The voltage at the common point of the resistors 4 and 5 varies, however, in proportion to the voltage of the motor. Consequently, the voltage at the diagonal branch of the bridge is a measure of the deviation of the voltage of the motor from the nominal value. This voltage is applied as a control magnitude to the base-emitter path of transistor 8. The transistor 8 amplifies the control magnitude and applies it, according to the invention, due to its collector being connected to the base of the complementary transistor 3, directly to transistor 3.

If the voltage of the battery 2 exceeds the voltage of the motor, the transistor 3 is cut off by means of the control magnitude to an extent such that exactly the nominal voltage builds up across the motor. The more the battery voltage approximates the voltage of the motor, the more the transistor 3 is opened until finally it is completely conducting so that a limit to the control range is reached. If, however, the transistor 3 is completely conducting, only a very small voltage, the so-called knee voltage, which is a few tenths of a volt, is set up across its collector-emitter path. While neglecting the resistor 9, which is always given a low resistance, the battery voltage may thus decrease substantially to the sum of the voltage of the motor and the knee voltage of transistor 3 without the speed of the motor varying. It will be appreciated that the circuit according to the invention provides, with the simplest means, a very large control range, up to approximately the nominal voltage of the motor, so that a very efficaceous use is made of the battery.

As previously mentioned, the resistor 9 serves to compensate for variations in the load on the motor. In fact, if the load on the motor varies, the current flowing through resistor 9 also varies. As is well known, the resistor 9 is included in the bridge so that the transistor 3 is opened further if the current of the motor increases. However, this means that its resistance becomes smaller so that the voltage drop across it is reduced. Hence the larger voltage drop produced across it by the larger current of the motor is counteracted.

As a matter of fact, in such a circuit arrangement, it may be preferable for several resistors of the bridge to be adjustable. Under certain conditions it may also be advantageous to choose the collector current of transistor 8 to be larger than the base current of transistor 3. For this purpose it is only necessary to connect a corresponding resistance between the collector of transistor 8 and the emitter of transistor 3, so that the function of the circuit arrangement proper is by no means influenced.

It is often also necessary to stabilize the circuit with respect to unfavourable temperature influences, which may simply be effected, for example, by adding a resistor having a negative temperature coefficient in parallel and/or in series with resistor 5. Temperature stabilisation may also be effected, as is well known, by using a diode having the same temperature variation as the transistor 8. The diode 7 of the present example is then preferably chosen such that it serves not only for providing a reference voltage, but also for stabilizing the circuit against temperature variations.

Figure 2:
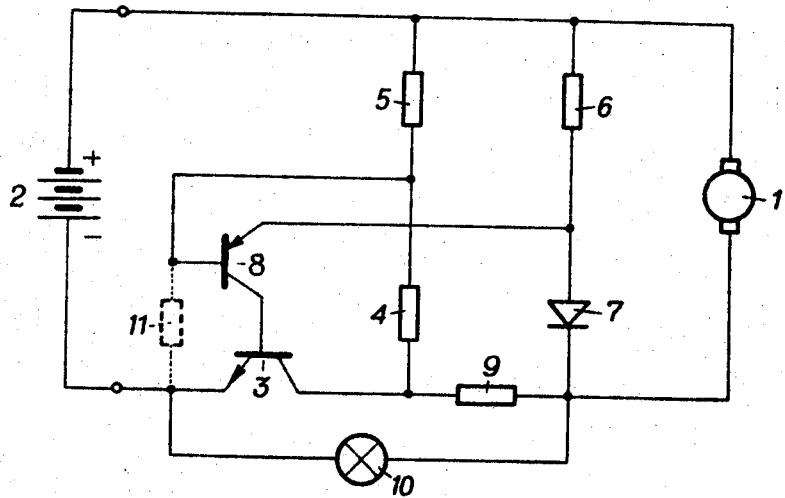

FIGURE 2 shows a circuit arrangement having an n-p-n type transistor in the circuit of the motor. According to the invention, the transistor 8 must then be a p-n-p type transistor. The structure and the operation of the arrangement are otherwise similar to that of the arrangement of FIGURE 1.

It is often desirable to indicate the charge condition of the battery. This may be effected in a simple manner, as shown in FIGURE 2, by connecting a small lamp 10 in parallel with transistor 3. Since, as previously mentioned, the voltage drop across transistor 3 is a measure of the magnitude of the battery voltage relative to the nominal voltage of the motor, the lamp in this arrangement will radiate brightly if the battery voltage is high and, will ultimately extinguish if the battery voltage approximates the nominal voltage of the motor. By connecting the lamp 10 in the circuit, a further advantage is obtained in that a small direct current flows continuously through the motor, thus providing a constant couple which is permanently active. It is alternatively possible to connect a resistor between the base of transistor 8 and the negative terminal of the battery, thus providing a small continuous current through the transistors 8 and 3 and hence through the motor 1. Such a resistor also facilitates the adjustment of voltage when the circuit arrangement is switched on.

What is claimed is:

1. A circuit arrangement for controlling the speed of a battery-fed electric motor comprising, a first transistor having emitter, collector and base electrodes, a battery, means connecting the emitter-collector path of said first transistor in series with said battery and said motor, a second transistor having its collector directly coupled to the base of said first transistor, means coupled to said motor for producing a control voltage proportional to the motor voltage, means for coupling said control voltage to the base electrode of said second transistor, characterized in that the two directly coupled transistors are of opposite conductivity types, the base current of the first transistor being provided by the collector current of the second transistor and that the battery is included in the emitter circuit of the first transistor.

2. A circuit arrangement as claimed in claim 1, further comprising a diode connected in the pass direction in the emitter circuit of the second transistor for compensating the influence of the temperature upon the current flowing through said transistor, characterized in that said diode is included in a bridge circuit coupled to said motor for stabilizing the speed of the motor against variations of the supply voltage, said diode producing a constant voltage that serves as a reference voltage source for the circuit.

3. A circuit arrangement as claimed in claim 1 further comprising a small lamp connected in parallel with the first transistor included in the circuit of the motor for indicating the charge condition of the battery feeding the circuit arrangement.

4. A temperature responsive speed control circuit for a DC motor comprising, a battery, a first transistor of one conductivity type having its emitter connected to one terminal of said battery, means connecting the emitter-collector path of said transistor in series circuit with said battery and said motor, a second transistor of opposite conductivity type having first and second electrodes that define a main current path and a control electrode for controlling the current in said main path, means coupled to said motor for producing a control voltage determined by the motor power, means for coupling said control voltage to the control electrode of said second transistor, and means directly coupling said second transistor first electrode to the base of said first transistor so that the base current of said first transistor flows through said main current path of the second transistor, said control voltage producing means including a temperature compensating diode connected in the forward direction with respect to the motor voltage in the second electrode circuit of said second transistor, said diode producing a constant voltage that is coupled to the second electrode of said second transistor to provide a reference voltage for regulating the motor speed despite variations of the battery voltage.

5. A circuit as described in claim 4 wherein the first and second electrodes of said second transistor comprise its collector and emitter, respectively, and said control electrode is the base electrode, said diode being connected in the base-emitter circuit of said second transistor so as to compensate for the influence of the temperature upon the current flow in said second transistor.

6. A speed control circuit for a DC motor comprising, a source of DC supply voltage, a first transistor of one conductivity type connected in series with said supply voltage and said motor with said supply voltage source connected in the emitter circuit of the transistor, a second transistor of opposite conductivity type having first and second electrodes that define a main current path and a control electrode for controlling the current in said main path, and means directly coupling said second transistor first electrode to the base of said first transistor so that the base current of said first transistor flows through said main current path of the second transistor, a control circuit having input terminals connected across the motor, said control circuit including a temperature compensating diode connected in the forward direction and in circuit with said second electrode of the second transistor to provide a reference voltage therefor, means coupling an output terminal of said control circuit to said second transistor control electrode to supply a control voltage thereto that varies the conductivity therein in a sense to counteract variations in the supply voltage.

7. A circuit as described in claim 6 wherein the first and second electrodes of said second transistor comprise its collector and emitter, respectively, and said control electrode is the base electrode, said control circuit comprising a bridge network having said diode in one arm and having its output terminals connected to the base and emitter electrodes of said second transistor.

8. A circuit as described in claim 7 wherein said bridge network includes an impedance element connected in series with said first transistor and said motor so as to produce at said output terminals a control voltage having a voltage component that is proportional to the motor current.

References Cited

UNITED STATES PATENTS

| 2,814,012 | 11/1957 | Swanson | 318—345 X |
| 3,309,596 | 3/1967 | Limley | 318—345 X |
| 3,324,372 | 6/1967 | Myers | 318—345 X |

ORIS L. RADER, *Primary Examiner.*

J. J. BAKER, *Assistant Examiner.*